US007035333B2

(12) United States Patent
Stenzel

(10) Patent No.: US 7,035,333 B2

(45) Date of Patent: Apr. 25, 2006

(54) METHOD OF REVERSE PLAY FOR PREDICTIVELY CODED COMPRESSED VIDEO

(75) Inventor: Robert Stenzel, Cherry Hill, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 564 days.

(21) Appl. No.: 10/011,545

(22) Filed: Dec. 5, 2001

(65) Prior Publication Data

US 2003/0103566 A1 Jun. 5, 2003

(51) Int. Cl.
*H04B 1/66* (2006.01)

(52) U.S. Cl. .................. 375/240.12; 386/68; 386/111; 386/112

(58) Field of Classification Search ........... 375/240.12, 375/240.16, 240.26, 240.06, 240.01; 348/392.1, 348/699, 700, 578; 386/67, 68, 109, 111, 386/112, 27, 33, 6, 1; 382/233, 236, 238; H04B 1/66
See application file for complete search history.

(56) References Cited

U.S. PATENT DOCUMENTS 5,959,690 A * 9/1999 Toebes et al. .............. 348/578
6,201,927 B1 * 3/2001 Comer ........................ 386/68
6,353,700 B1 * 3/2002 Zhou ........................... 386/68
6,356,708 B1 * 3/2002 Krause et al. .............. 386/109
6,442,201 B1 * 8/2002 Choi ..................... 375/240.12
6,539,120 B1 * 3/2003 Sita et al. ................... 382/233
2005/0078943 A1 * 4/2005 Kimura ....................... 386/68

* cited by examiner

*Primary Examiner*—Tung Vo
(74) *Attorney, Agent, or Firm*—RatnerPrestia

(57) ABSTRACT

Apparatus and a method of displaying a predictively coded compressed video signal in a reverse time sequence is provided. The method includes retrieving key frames of a first group of pictures (GOP) upon initiation of a reverse play command. The retrieved key frames include any intra coded frame (I-frame) and predictively encoded frame (P-frame) in the first GOP. These key frames are decoded and stored in a memory. Subsequent bidirectionally predictively encoded frames (B frames) of the first GOP are then decoded and displayed as they are encountered in the reverse time sequence. Simultaneously, the I and P frames of a second GOP are decoded and stored in the memory. The second GOP is the next preceding GOP in the reverse time sequence so that, when the reverse play traverses the first GOP boundary, the decoding of key frames of the second GOP boundary has been completed.

10 Claims, 4 Drawing Sheets

| I0 | P3 | B1 | B2 | P6 | B4 | B5 | I9 | B7 | B8 | P12 | B10 | B11 | P15 | B13 | B14 | I18 | B16 | B17 | P21 | B19 | B20 |
|---|---|---|---|---|---|---|---|---|---|---|---|---|---|---|---|---|---|---|---|---|---|
| | | I0 | B1 | B2 | P3 | B4 | B5 | P6 | B7 | B8 | I9 | B10 | B11 | P12 | B13 | B14 | P15 | B16 | B17 | I18 | B19 |

FIG. 2A

| I9 | P12 | P15 | B17 | B16 | I0 | B14 | B13 | P3 | B11 | B10 | P6 | B8 | B7 | I-9 | B5 | B4 | P-6 | B2 | B1 | P-3 | B-1 |
|---|---|---|---|---|---|---|---|---|---|---|---|---|---|---|---|---|---|---|---|---|---|
| I18 | I18 | I18 | I18 | B17 | B16 | P15 | B14 | B13 | P12 | B11 | B10 | I9 | B8 | B7 | P6 | B5 | B4 | P3 | B2 | B1 | I0 |

FIG. 2B

METHOD OF REVERSE PLAY FOR PREDICTIVELY CODED COMPRESSED VIDEO

The present invention relates, in general, the processing of a compressed video signal. More particularly, this invention provides a method for improving the quality of the display when a predictively coded video signal is played in reverse.

BACKGROUND OF THE INVENTION

A widely used predictively-coded video compression standard is that adopted by the Moving Picture Experts Group (MPEG). The MPEG-2 standard was initially proposed and developed as an open standard by the international standards organization (ISO), its main strengths are its flexibility and compression efficiency. MPEG achieves a high compression rate by using encoding techniques that remove much of the redundancy in the video signal. Spatial redundancy is reduced by applying a frequency-domain transform to blocks of picture elements (pixels) in the image and encoding the frequency-domain coefficients. Temporal redundancy is reduced by intra-frame encoding only a relatively few images (i.e. using only data in the image frame) while encoding most of the frames predictively, that is to say, based only on the changes from a previously encoded frame. MPEG encoded video is organized as groups of pictures (GOPs) including at least one intra-frame encoded image (I-frame) and which may include one or more predictively encoded images (P-frames) and one or more bidirectionally predictively encoded images (B-frames). Note that P-frames and B-frames are optional and need not be included in a GOP. Because of its high compression efficiency and because it accommodates a large variety of video formats, the MPEG-2 standard is well suited for data transmission and storage.

MPEG-2 video compression is lossy, that is to say, significant information is lost when the signal is compressed into I-frames, P-frames and B-frames. The standard is designed, however, to take advantage of the human visual system in order to hide these losses. Much of the lost information appears as quantization distortion of high spatial frequency components of the image. The human visual system is relatively insensitive to this type of distortion.

Because of the multiple encoding steps used to compress the video images, considerable processing is typically used to reproduce the image. The predictive decoding used to reproduce the image is problematic for trick-play features such as playing the video program in reverse. To reduce the complexity of such modes, many existing systems decode and display only the I frames of the GOP's for reverse play. Because these frames may be separated by, for example, 10 or more frame intervals, the human visual system detects the shortcomings of the strobe-like effect of successive images flashed on the screen at a frame rate of, for example, 6 Hz.

Accordingly, there is a need for a reverse decoding and display method offering a significant improvement in reverse play quality for predictively coded compression signals, such as MPEG-2 signals.

SUMMARY OF THE INVENTION

The subject invention is embodied in a method of reverse playing a predictively coded compressed video signal for display. The method includes retrieving only the I and P frames of a first group of pictures (GOP) upon initiation of a reverse play command. The retrieved first GOP is the GOP displayed in the reverse time domain direction (i.e., the GOP currently being displayed or that was displayed immediately preceding the reverse-play command). The I and P frames of the first GOP are first decoded and stored in a memory. Subsequent B frames of the first GOP are then constructed as needed, while the previously decoded I and P frames are being played in their proper sequence. While the I and P frames of the current GOP are being displayed, the I and P frames of a second GOP are retrieved, decoded and stored in the memory. The second GOP is the next preceding GOP so that when the reverse play traverses the start of the first GOP, the decoding of the I and P frames for this preceding GOP have been decoded and stored.

It is to be understood that both the foregoing general description of the invention and the following detailed description are exemplary, but are not restrictive, of the invention.

BRIEF DESCRIPTION OF THE DRAWING

The invention is best understood from the following detailed description when read in conjunction with the accompanying drawings.

FIG. 2A is a standard predictively decoding and display sequence table;

FIG. 2B is a reverse decoding and display sequence table in accordance with the present invention.

DETAILED DESCRIPTION OF THE INVENTION

Certain terminology used in the following description is for convenience only and is not limiting. The term "predictively coded" is generally defined as referring to a compression format employing temporal prediction such as the Moving Picture Expert Group standard (MPEG). The term "reverse play" is generally defined as the decoding and replay of the predictively coded video signal in reverse frame order.

The present invention provides a method of improving the quality of images displayed during the reverse play of a predictively coded compressed video signal. The method in accordance with the present invention may be employed by any number of audio-visual devices known to those skilled in the art. The method eliminates the "strobing" effect caused by prior art reverse playing methods which utilize only the I frames of an MPEG signal in reverse playing a predictively coded compressed audio-visual signal.

I. MPEG Decoder

Figure 1:
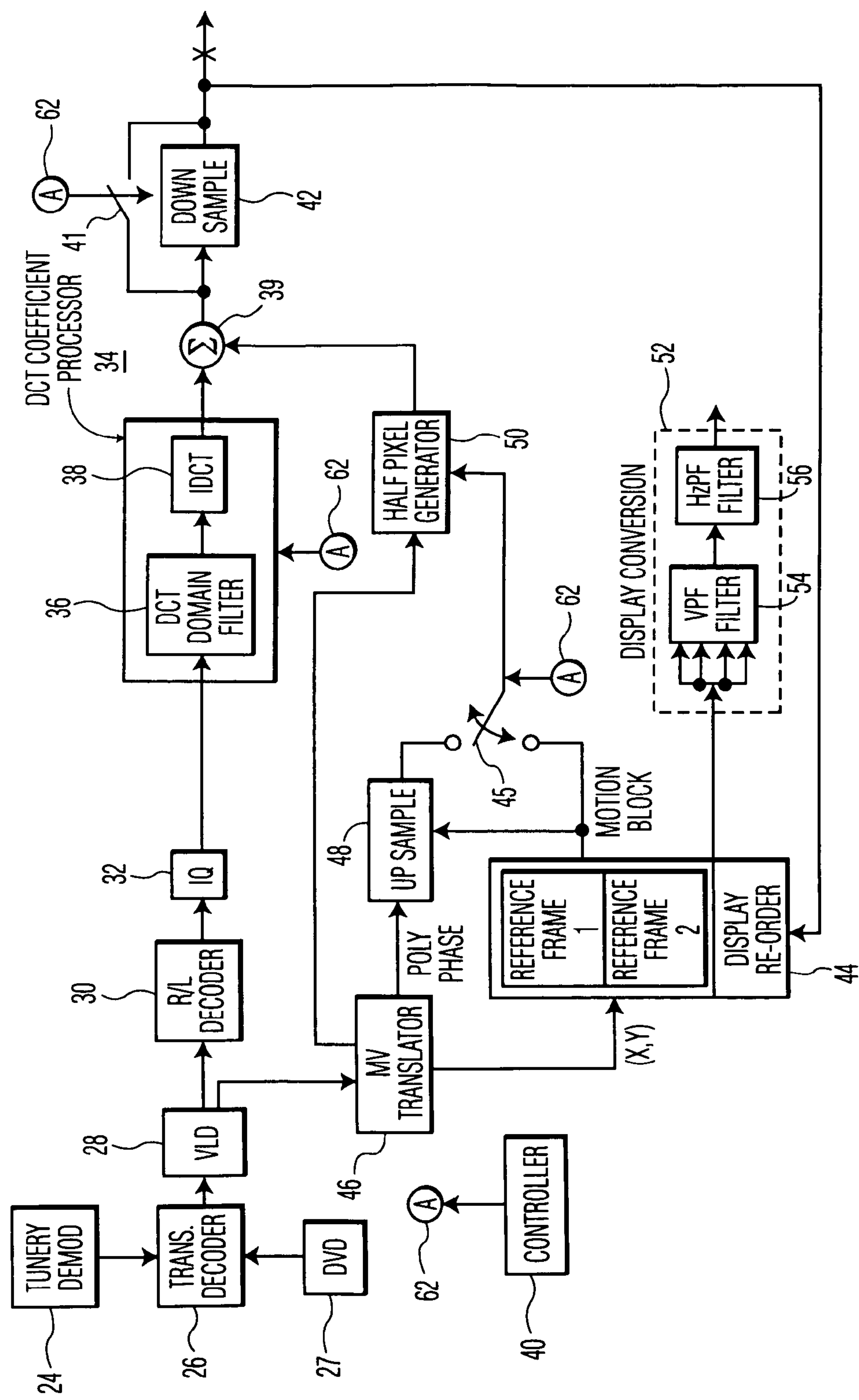
FIG. 1 is a block diagram of an exemplary MPEG decoder

FIG. 1 is a block diagram illustrating an exemplary configuration of a television receiver including an MPEG decoding and decompression system that incorporates down conversion. This embodiment of a decoding and decompression system 200 includes a tuner/demodulator 24 that receives MPEG-2 encoded television signals from, for example, a satellite dish, a digital cable hookup or an antenna. The tuner/demodulator 24 tunes to the channel carrying the requested program and demodulates the television signal transmitted in that channel to produce a stream of transport packets. The transport packets are applied to a transport decoder 26 which separates out packets corresponding to audio, video and data portions of a particular program selected by a viewer. This program may have been selected, for example, using a remote control device or other user interface through a controller 40. In the exemplary embodiment of the invention, the controller 40 may be a part of the transport decoder 26. The transport decoder 26 may also be coupled to receive transport packets from a prerecorded medium such as a digital versatile disk (DVD) player 27, a digital video cassette recorder or a personal digital recorder, such as the ReplayTV system. It is these packets that are of most interest to the subject invention.

The output signals of the transport decoder are a video bit-stream, an audio bit-stream and, optionally, a data bit-stream. Because the subject invention concerns methods for processing video data, only the video bit-stream is shown in FIG. 1. The television receiver shown in FIG. 1 also includes a variable length decoder (VLD) 28, a run-length (R/L) decoder 30, an inverse quantizer 32 and a DCT coefficient processor 34. As shown in FIG. 1, the DCT coefficient processor 34 comprises a DCT domain filter 36 and an inverse discrete cosine transform (IDCT) processor 38. The television receiver shown in FIG. 1 can decode video images with or without down conversion. When video images are decoded without down conversion, the DCT coefficient processor comprises only the IDCT processor. Note that, for completeness, FIG. 1 depicts the primary components of a MPEG decoding system incorporating down conversion. A more detailed description of this decoding processor may be found in U.S. Pat. No. 6,175,592 entitled FREQUENCY DOMAIN FILTERING FOR DOWN CONVERSIONS OF DCT ENCODED PICTURE. Although the invention is described in terms of a decoder that performs down conversion, it is contemplated that it may be practiced using other types of decoders that may or may not perform down conversion, as long as sufficient memory is provided.

The exemplary digital television system shown in FIG. 1 may be used to allow both high-definition television (HDTV) signals and standard definition television (SDTV) signals to be presented on an SDTV display. This exemplary system may receive either HDTV signals, that need to be filtered and downsampled before they can be displayed on the viewer's SDTV monitor, or SDTV signals that may be displayed on the SDTV monitor without conversion. Controller 40 determines whether the DCT coefficients are to be downsampled and generates a control signal 62. Control signal 62 is provided to switches 41 and 45, and to the DCT coefficient processor 34. For example, when an HDTV signal is received, controller 40 provides control signal 62 such that switch 41 is open and switch 45 provides upsampled data to the half pixel generator (i.e., switch 45 is in the up position in FIG. 1). Control signal 62 is also provided to the DCT coefficient processor 34 such that the DCT coefficients of each block are lowpass filtered in the DCT domain during HDTV reception, before conversion to the spatial domain.

When SDTV signals are received, no down conversion or filtering is needed as these signals may be decoded and displayed on the SDTV monitor. In this instance, the controller 40 provides control signal 62 such that switch 41 is closed and switch 45 provides motion block data to the half pixel generator (i.e., switch 45 is in the lower position in FIG. 1), thus bypassing the downsampling and upsampling operations. The controller 40 also controls the DCT coefficient processor 34 to bypass the DCT domain filter when decoding the SDTV signals.

In operation, the encoded bit-stream is received and decoded by VLD 28. In addition to header information used by digital television system, the VLD 28 provides run length encoded DCT coefficients for each block and macroblock, and motion vector information. The DCT coefficients are run length decoded in the R/L decoder 30 and inverse quantized by the inverse quantizer 32.

The inverse quantizer 32 provides the DCT coefficients to the DCT filter 36 which may perform a lowpass filtering in the frequency domain by weighting the DCT coefficients with predetermined filter coefficient values before providing them to the IDCT processor 38. The IDCT processor 38 converts the filtered DCT coefficients into spatial pixel values by performing an inverse discrete cosine transform operation.

While the exemplary embodiment of the invention uses a frequency domain filter to reduce the resolution of the image data prior to downsampling, it is contemplated that a temporal domain low-pass filter may be used in place of or in conjunction with the frequency domain filter.

The spatial pixel values provided by the IDCT processor 38 may represent full pixel values (e.g. when decoded from an I-frame) or residual pixel values (e.g. when decoded from a P-frame or B-frame). When residual pixel values are provided by the processor 38, they are summed with reference pixel values provided by a half-pixel generator 50 from one or two reference frames stored in a multi-frame memory 44. The MPEG-2 standard specifies motion compensated predictive coding, so, each macroblock of encoded coefficients may include a motion vector The motion vectors are separated from the bit-stream by the VLD 28 and provided to a motion vector translator 46. If the video image is being down-converted, the motion vector translator 46 translates the motion vectors for the reduced-size frames stored in the memory 44, as described below. The exemplary motion vector translator provides coordinates for the reference macroblock to the memory 44 and provides an indication of the up-sampling phase to be used by the upsampling processor 48 to reconstitute a full-sized macroblock from the down-sampled reference macroblock provided from the memory 44. If the television receiver is performing a down-conversion operation, then the upsampled macroblock is provided by the upsample processor 48 to the half pixel generator 50 via the switch 45. If full-sized images are to be decoded and displayed, then full-sized macroblocks are provided to the half-pixel generator 50. The half-pixel generator 50 interpolates the reference macroblocks to realize half-pixel accuracy in the reference data.

After the reference macroblocks are added to the residual pixel data in the summing circuit 39, the resultant macroblocks are applied to the down-sampling circuit 42 and then to the memory 44, if the television receiver is performing a down-conversion operation. Alternatively, if the receiver is not in down-sampling mode, the summed macroblocks are applied directly to the memory 44 to be processed for display.

In the exemplary embodiment of the invention, the down-sampled video image is reduced in size by a factor of two or three but only in the horizontal direction. The display conversion processor 52 including the vertical filter 54 and horizontal filter 56 process the down-sampled image data to produce images that are appropriate for display on the viewer's display device. It is contemplated, however, that the downsampler may decimate the image pixels in both the horizontal and vertical directions before storing the decimated images into the memory 44. Before vertical decimation is performed, it is desirable to apply a vertical low-pass filter to the image. Thus, in this alternative embodiment of the invention, the filter 36 or its equivalent temporal domain filter performs filtering in both the horizontal and vertical directions.

II. Reverse Play Operation

FIGS. 2A and 2B are tables of forward and reverse time domain decode and display sequences. Specifically FIGS. 2A and 2B show forward and reverse decode and display sequences of a series of GOPs (the sequence in which the image data is received is shown above the sequence in which the image data is displayed). Each frame is represented by a letter and a number. The number indicates the order in which the frame is displayed and the letter indicates the type of the frame. For example, I0 is the first frame to be displayed and is an I-frame; frame P3 is the fourth frame to be displayed and is a P-frame; and B1 is the second frame to be displayed and is a B-frame. In a typical forward-play operation, Frame I0 is decoded and stored for later display. Next, frame P3 is decoded using information from frame I0, and stored. Frame B1 is then decoded, using information from both of the stored frames I0 and P3. Frame I0 is displayed while frame B1 is decoded and frame B1 is displayed while frame B2 is decoded. Frame B2 is displayed while frame P6 is being decoded and stored, replacing frame I0. Frames B4 and B5 are then bidirectionally predictively decoded, based on data in the stored frames P3 and P6.

FIG. 2B shows how an exemplary MPEG signal played back in reverse (i.e., for display in a reverse time sequence) in accordance with the method of the present invention. Each GOP includes one I-frame, two P-frames and four B frames. (blocks having open-font characters indicate the decode order of a first GOP common to both FIG. 2A and FIG. 2B).

As shown in FIG. 2B, when reverse play is requested or initiated by an appropriate audio visual device, I and P frames from the previous or "first" group of pictures (GOP) are retrieved out of order, decoded and stored. While these I and P frames are being recovered and decoded, a previously decoded frame may be displayed. The I and P frames may be obtained from a pre-recorded medium by the transport decoder 26 of FIG. 1 in accordance with a command set of controller 40. In the example of FIG. 2B, specifically, frames I9, P12 and P15 are decoded and stored in a memory 44 of the audio-visual device of FIG. 1. After these frames are decoded and stored, reverse play begins.

The initial response time (i.e., latency) of the television display processor from the initiation of the reverse play command by a user is proportional to the number of I and P frames of the GOP being decoded for reverse play. For example, where the GOP is an ATSC 15:3 signal, five key frames (i.e. I-frames and P-frames) may be decoded, thus latency may include five frame decode times in addition to any electromechanical response time (e.g., seek latency) of the DVD 27. It is contemplated, however, that except for the first frame, the electromechanical response time to access a frame may overlap the decoding of the previously recovered frame.

While the reverse play sequence continues, B frames are decoded and displayed as they are encountered in the bit-stream while the stored I and P frames are displayed in proper sequence (i.e., B17, B16, P15, B14, B13, P12, B11, B10 and I9). During the time that the I and P frames from the current GOP are being displayed, the I and P frames from the next previous or "second" GOP are decoded (i.e., I0, P3 and P6) and may replace the I and P frames that are no longer needed for display or decoding purposes. Consequently, when the reverse play operation traverses the GOP boundary between the first GOP and the second GOP, all of the I and P frames from the second GOP have already been decoded and stored.

In the normal decoding sequence of FIG. 2A the memory 44 typically holds three decoded frames at a time, two reference frames and one frame that is being decoded and displayed. In the reverse mode of the present invention, the number of stored frames is at least the number of I and P frames in the GOP structure and may include an additional stored frame if a full frame of the image to be displayed is stored. The additional memory requirement may be reduced by down-sampling the I and P frames of the GOP structure, storing them in the memory 44 in reduced resolution and up-sampling the reduced resolution frames both for reference data and for display.

III. Reverse Play Sequence

The exemplary embodiment of the invention includes a frame-store memory that holds five video frames. Consequently, if a GOP includes more than three I and P frames, the system down-samples the I and P frames. It is desirable to have one or more extra frame memories so that an I or P-frame from the next-previous GOP may be decoded and stored while an I or P-frame from the current GOP is being displayed. For example, with reference to FIG. 2B, while frame P15 is being displayed, the system may decode and store frame I0. This frame can not over-write frames P15 or P12, however, as those frames are still needed to decode frames B14 and B13. Once these frames have been decoded and displayed, and frame P15 is being displayed, the system may over-write frame P15 with frame P3. The exemplary embodiment of the invention shown in FIG. 1 may store less than a complete frame of the image that is being displayed.

Figure 3:
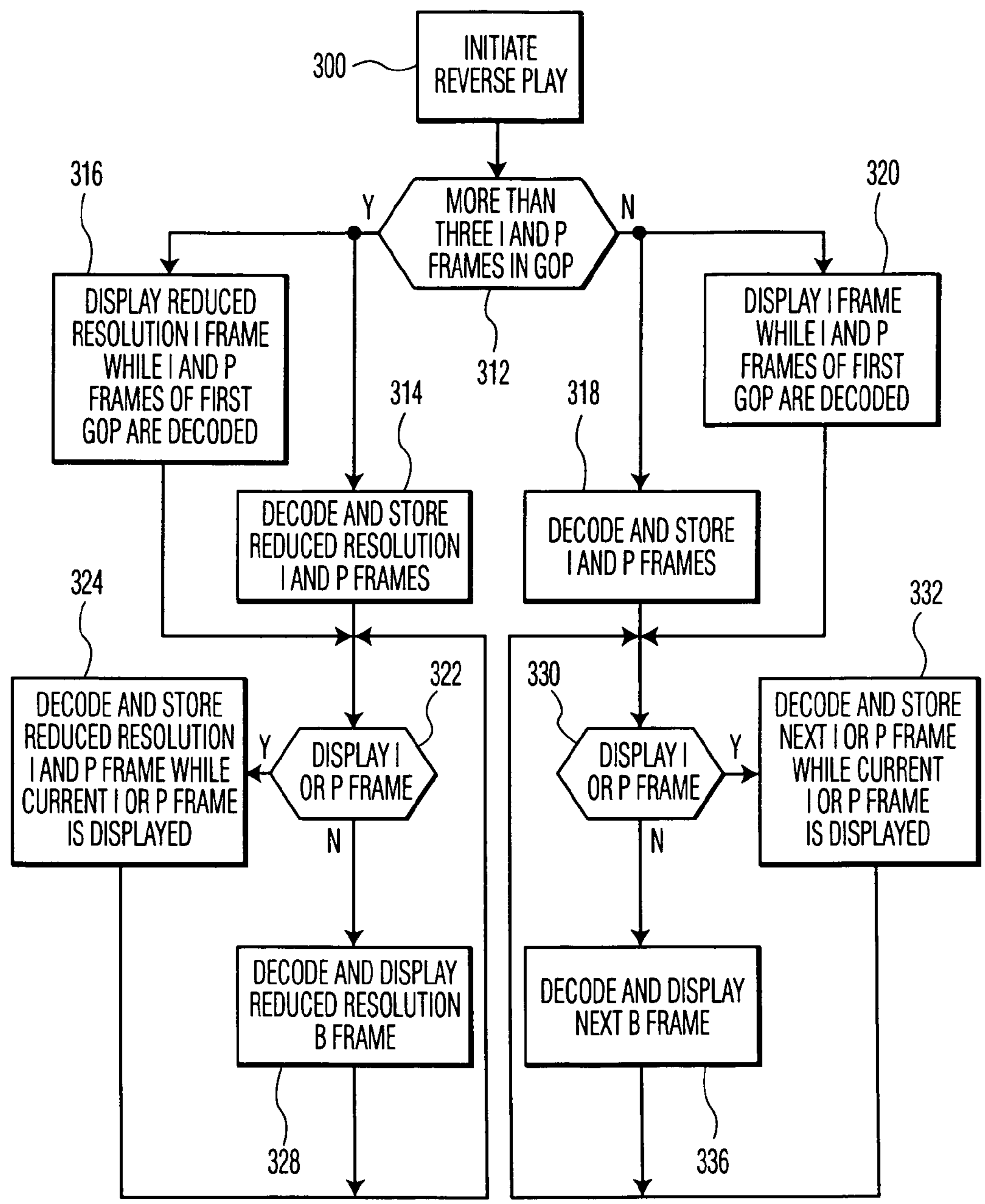
FIG. 3 is a flow diagram for reverse decoding and displaying method in accordance with the present invention.

FIG. 3 is a flow diagram outlining the operation of the method of the present invention. At step 300, reverse play is requested or initiated by the viewer of a display device including an embodiment of the present invention. Next, at step 312, the system determines the number of I and P frames in the GOP. This information is available, for example, in the sequence header of the MPEG video signal. If the GOP includes more than three frames, steps 314 and 316 are executed in parallel. Step 316 repeatedly displays the most recent frame that currently is stored in the memory 44 while step 314 identifies, decodes, down-samples and stores the I-frames and P-frames from the previous GOP. After the I and P-frames of the first GOP have been decoded and stored, the process continues at step 322 which determines whether, in the normal display sequence an I-frame or a P-frame is to be displayed. If so, step 324 is executed which displays the I or P frame and, at the same time, decodes and stores a reduced-resolution I or P frame from the next-previous GOP.

If, at step 322, neither an I-frame nor a P-frame is to be displayed then the next frame to be displayed is a B-frame. Step 328 decodes and displays the reduced-resolution B-frame without storing it. After step 324 or step 328, control returns to step 322 to display the next frame.

If, at step 312, the GOP includes three or fewer key frames, then the process executes steps 318 and 320 in parallel. Step 318 decodes and stores the I and P frames in the GOP at full resolution while step 320 repeatedly displays the most recent frame that is currently stored in the memory 44. After steps 318 and 320, step 330 is executed which determines whether an I-frame or a P-frame is to be displayed. If so, step 332 is executed which displays the full-resolution I or P-frame from memory while decoding and storing the next I or P-frame from the next-previous GOP. If, at step 330, the frame to be displayed is neither an I-frame nor a P-frame then, step 336 is executed which decodes and displays a B-frame. After step 332 and step 336, the process branches back to step 330 to decode and/or display the next frame in the sequence.

Using the algorithm shown in FIG. 3, during the time when the decoded I and P frames from the current or first GOP are being played to the display, the I and P frames from the next previous or "second" GOP are being decoded. Thus, when the reverse play traverses the GOP boundary between the first and second GOP, decoding of all of the key frames (i.e. the I and P frames) from the next previous GOP has already been completed. This method continues for the entire sequence or "duration" of the reverse play. Because the display of the I-frames and P-frames of the current GOP overlap the decoding of the I-frames and P-frames from the next previous GOP, the only delay experienced by the viewer is the initial delay in decoding and storing the key frames from the current GOP.

While the invention has been described in terms of a mixed hardware and software embodiment, it is contemplated that it may be practiced entirely in software residing on a computer readable carrier such as an optical disc, magnetic disc, memory card or radio frequency or audio frequency carrier wave.

Although illustrated and described above with reference to certain specific embodiments, the present invention is nevertheless not intended to be limited to the details shown. Rather, various modifications may be made in the details within the scope and range of equivalents of the claims and without departing from the invention, as defined by the following claims.

What is claimed is:

1. A method for displaying a predictively coded compressed video signal in a reverse time sequence comprising the steps of:

decoding and storing all I-frames and P-frames from a first group of pictures (GOP), exclusive of I and P frames from any other GOP, upon initiation of a reverse play command; and after storing the decoded I-frames and P-frames from the first GOP, displaying video images from the first GOP in the reverse time sequence, including the steps of:

decoding any bidirectionally predictively encoded frames (B-frames) using the stored I-frames and P-frames and displaying the B-frames as they are decoded;

displaying the stored I-frames and P-frames of the first GOP as they are encountered in the reverse time sequence; and while displaying the I-frames and the P-frames, decoding and storing respective I-frames and P-frames from a second GOP, exclusive of I and P frames from any other GOP, following the first GOP in the reverse time sequence;

wherein the display of frames from the first GOP begins prior to the decoding of any frame from the second GOP.

2. A method for displaying a predictively coded compressed video signal in a reverse time sequence comprising the steps of:

decoding and storing all I-frames and P-frames from a first group of pictures (GOP), exclusive of I and P frames from any other GOP, upon initiation of a reverse play command; and after storing the decoded I-frames and P-frames from the first GOP, displaying video images from the first GOP in the reverse time sequence, including the steps of:

decoding any bidlrectionally predictively encoded frames (B-frames) using the stored I-frames and P-frames and displaying the B-frames as they are decoded;

displaying the stored I-frames and P-frames of the first GOP as they are encountered in the reverse time sequence; and while displaying the I-frames and the P-frames, decoding and storing respective I-frames and P-frames from a second GOP, exclusive of I and P frames from any other GOP, following the first GOP in the reverse time sequence;

wherein:

the step of decoding and storing the I-frames and P-frames includes the step of downsampling the decoded I-frames and P-frames to produce respective downsampled I-frames and P-frames and storing the downsampled I-frames and P-frames;

the step of decoding the B-frames includes the step of filtering the decoded B-frames to display a reduced-resolution image; and the step of displaying the I-frames and the P-frames includes the step of upsampling the stored I-frames and P-frames to provide respective reduced-resolution images for display.

3. A method according to claim 1, wherein the predictively coded compressed video signal is an MPEG compressed video signal and the steps of decoding I-frames and P-frames include the step of applying an MPEG decoding process.

4. A method for displaying an MPEG coded compressed video signal in a reverse time sequence comprising the steps of:

retrieving a first group of pictures (GOP) upon initiation of a reverse play command, the retrieved first GOP being the GOP displayed immediately preceding the command;

decoding all I-frames and P-frames, exclusive of I and P frames from any other GOP, of the first GOP and storing them in a memory;

displaying the decoded I-frames and P-frames of the first GOP as the I-frames and P-frames are encountered in the reverse time sequence;

constructing and displaying any B frames of the first GOP as the B-frames are encountered in the reverse time sequence; and decoding I-frames and P frames of a second GOP, exclusive of I and P frames from any other GOP, and storing the decoded I-frames and P-frames of the second GOP in the memory, the second GOP being a next preceding GOP, wherein each I-frame and P-frame of the second GOP is decoded while a respective one of the I-frames and P-frames of the first GOP is being displayed;

wherein the display of frames from the first GOP begins prior to the decoding of any frame from the second GOP.

5. A method according to claim 4 wherein:

the step of decoding and storing the I-frames and P-frames of the first GOP includes the step of downsampling the decoded I-frames and P-frames of the first GOP to produce downsampled key frames and storing the downsampled key frames;

the step of decoding the B-frames includes the step of filtering the decoded B-frames to display a reduced-resolution image; and the step of displaying the I-frames and the P-frames includes the step of upsampling the stared I-frames and P-frames to display respective reduced-resolution images.

6. Apparatus which displays a predictively coded compressed video signal in a reverse time sequence comprising:

a video decoder which decodes intra-coded frames (I-frames) and predictively coded frames (P-frames) from a first group of pictures (GOP), exclusive of I and P frames from any other GOP, upon initiation of a reverse play command;

a memory into which the video decoder stores the decoded I-frames and P-frames of the first GOP;

means for displaying a frame stored in memory while the I-frames and P-frames of the first GOP are decoded; and a controller that controls the video decoder, the memory and the means for displaying such that, after the decoded I-frames and P-frames of the first GOP have been stored, the controller:

a) controls the video decoder to decode bidirectionally predictively encoded frames (B-frames) using the stored key frames and controls the means for displaying to display the B-frames as they are decoded;

b) controls the means for displaying to display the I-frames and P-frames from the memory as they are encountered in the reverse time sequence;

c) controls the decoder and the memory to decode and store I-frames and P-frames from a second GOP, exclusive of I and P frames from any other GOP, following the first GOP in the reverse time sequence, while respective ones of the I-frames and P-frames of the first GOP are displayed; and d) controls the means for displaying to begin displaying decoded frames from the first GOP before decoding any frame from the second GOP.

7. Apparatus which displays a predictively coded compressed video signal in a reverse time sequence comprising:

a video decoder which decodes intra-coded frames (I-frames) and predictively coded frames (P-frames) from a first group of pictures (GOP), exclusive of I and P frames from any other GOP, upon initiation of a reverse play command;

a filter, coupled to the decoder for generating respective reduced-resolution versions of the decoded I-frames, P-frames and B-frames;

a downsampler which decimates the reduced-resolution versions of the decoded I-frames and P-frames;

a memory into which the video decoder stores the decoded and downsampled I-frames and P-frames of the first GOP;

means for displaying a frame stored in memory while the I-frames and P-frames of the first GOP are decoded; and a controller that controls the video decoder, the memory and the means for displaying such that, after the decoded I-frames and P-frames of the first GOP have been stored, the controller:

a) controls the video decoder to decode bidirectionally predictively encoded frames (B-frames) using the stored key frames and controls the means for displaying to display the B-frames as they are decoded;

b) controls the means for displaying to display the I-frames and P-frames from the memory as they are encountered in the reverse time sequence;

c) controls the decoder and the memory to decode and store I-frames and P-frames from a second GOP, exclusive of I and P frames from any other GOP, following the first GOP in the reverse time sequence, while respective ones of the I-frames and P-frames of the first GOP are displayed.

8. Apparatus for displaying a predictively coded compressed video signal in a reverse time sequence comprising:

means for decoding and storing any I-frames and P-frames from a first group of pictures (GOP), exclusive of I and P frames from any other GOP, upon initiation of a reverse play command; and means for displaying video images from the first GOP in the reverse time sequence, including:

means for decoding any bidirectionally predictively encoded frames (B-frames) using the stored I-frames and P-frames and for displaying the B-frames as they are decoded;

means for displaying the stored I-frames and P-frames of the first GOP as they are encountered in the reverse time sequence; and means for decoding and storing I-frames and P-frames from a second GOP, exclusive of I and P frames from any other GOP, following the first GOP in the reverse time sequence, while the means for displaying the stored I-frames and P-frames displays respective ones of the I-frames and the P-frames of the first GOP;

wherein the means for displaying begins displaying frames from the first GOP before decoding any frame from the second GOP.

9. Apparatus according to claim 8 wherein:

the means for decoding and storing the I-frames and P-frames includes means for downsampling the decoded I-frames and P-frames to produce respective downsampled I-frames and P-frames and means for storing the downsampled I-frames and P-frames;

the means for decoding the B-frames includes filtering means for filtering the decoded B-frames to display a reduced-resolution image; and the means for displaying the stored I-frames and P-frames includes upsampling means for upsampling the stored downsampled I-frames and P-frames to provide respective reduceds-resolution images for display.

10. A computer-readable carrier including computer program instructions that cause a computer to perform a method of displaying an MPEG coded compressed video signal in a reverse time sequence, the method comprising the steps of:

retrieving a first group of pictures (GOP) upon initiation of a reverse play command, the retrieved first GOP being the GOP displayed immediately preceding the command;

decoding any I-frames and P-frames of the first GOP, exclusive of I and P frames from any other GOP, and storing them in a memory;

displaying the decoded I-frames and P-frames of the first GOP as the I-frames and P-frames are encountered in the reverse time sequence;

decoding and displaying any B frames of the first GOP as the B-frames are encountered in the reverse time sequence; and decoding I-frames and P frames of a second GOP, exclusive of I and P frames from any other GOP, and storing the decoded I-frames and P-frames of the second GOP in the memory, the second GOP being the next preceding GOP, wherein each I-frame and P-frame of the second GOP is decoded while a respective one of the I-frames and P-frames of the first GOP are being displayed;

wherein the computer program instructions control the display of frames from the first GOP to begin prior to the decoding of any frame from the second GOP.

* * * * *